(12) United States Patent
Tajan et al.

(10) Patent No.: US 10,648,406 B2
(45) Date of Patent: May 12, 2020

(54) MEANS FOR CONTROLLING A PITCH CHANGE SYSTEM COMPRISING AN ANTI-ROTATION DEVICE, A PITCH CHANGE SYSTEM EQUIPPED WITH SAID CONTROL MEANS, AND A CORRESPONDING TURBINE ENGINE

(71) Applicant: SAFRAN AIRCRAFT ENGINES, Paris (FR)

(72) Inventors: Sébastien Emile Philippe Tajan, Sucy en Brie (FR); Eddy Keomorakott Souryavongsa, Lagny sur Marne (FR); Regis Eugéne Henri Servant, Vigneux sur Seine (FR); Adrien Jacques Philippe Fabre, Montrouge (FR); Stephane Ibarzo, Boucau (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 260 days.

(21) Appl. No.: 15/683,394

(22) Filed: Aug. 22, 2017

(65) Prior Publication Data

US 2018/0058324 A1    Mar. 1, 2018

(30) Foreign Application Priority Data

Aug. 26, 2016 (FR) ...................... 16 57973

(51) Int. Cl.
  *F02C 7/06* (2006.01)
  *F01D 25/18* (2006.01)
  *B64C 11/32* (2006.01)

(52) U.S. Cl.
  CPC ................ *F02C 7/06* (2013.01); *B64C 11/32* (2013.01); *F01D 25/18* (2013.01);
  (Continued)

(58) Field of Classification Search
  CPC .......... F02C 7/06; B64C 11/32; B64C 11/325; B64C 11/38; B64C 11/385; F01D 25/166;
  (Continued)

(56) References Cited

U.S. PATENT DOCUMENTS 3,603,697 A * 9/1971 Lane ..................... B64C 27/022
                                                                416/33
4,046,486 A * 9/1977 Kolb ....................... F01D 25/18
                                                                416/157 R (Continued)

FOREIGN PATENT DOCUMENTS

WO    WO-2014001723    1/2014
WO    WO-2014013201    1/2014

OTHER PUBLICATIONS

French Search Report and Written Opinion, dated Dec. 15, 2016, French Application No. 1657973.

Primary Examiner — Kenneth J Hansen
Assistant Examiner — Maranatha Boardman
(74) Attorney, Agent, or Firm — Womble Bond Dickinson (US) LLP

(57) ABSTRACT

A controller for controlling a system for changing the pitch of blades of a turbine engine propeller, the controller includes a fixed member (28) and a member (29) which is movable in translation along a longitudinal axis (X) relative to the fixed member (28), and an anti-rotation device (33) configured so as to prevent the rotation of the movable member (29) relative to the fixed member (28) about the axis (X). The anti-rotation device includes a longitudinal structural crossmember (35) which is mounted by a first and a second end (36, 37) on the fixed member, and support and guide unit (57) integrally in translation the movable member along the axis (X), the crossmember extending radially outside the movable member and the fixed member relative (Continued)

to a radial axis (Y) which is perpendicular to the axis (X) and being guided through the support and guide unit.

10 Claims, 5 Drawing Sheets

(52) U.S. Cl.
CPC .... *F05D 2220/323* (2013.01); *F05D 2240/54* (2013.01); *F05D 2260/98* (2013.01)

(58) Field of Classification Search
CPC ........ F01D 25/18; F01D 25/186; F01D 25/28; F05D 2250/34
See application file for complete search history.

(56) References Cited

U.S. PATENT DOCUMENTS

| | | | | |
|---|---|---|---|---|
| 4,061,440 A * | 12/1977 | Belliere | ................ | F04D 29/323 |
| | | | | 416/157 R |
| 4,419,050 A * | 12/1983 | Williams | ............... | B63H 3/008 |
| | | | | 416/154 |
| 4,591,313 A * | 5/1986 | Miyatake | ............. | B64C 11/306 |
| | | | | 416/127 |
| 4,657,484 A | 4/1987 | Wakeman et al. | | |
| 4,858,491 A * | 8/1989 | Shube | ..................... | B64C 13/42 |
| | | | | 74/665 B |
| 5,186,608 A * | 2/1993 | Bagge | .................... | B64C 11/38 |
| | | | | 416/147 |
| 5,199,850 A * | 4/1993 | Carvalho | .............. | B64C 11/325 |
| | | | | 416/153 |
| 5,431,539 A * | 7/1995 | Carvalho | ................ | B64C 11/32 |
| | | | | 416/157 R |
| 7,931,407 B2 * | 4/2011 | Begin | ..................... | F01D 25/18 |
| | | | | 384/475 |
| 8,246,503 B2 * | 8/2012 | Sheridan | ................... | F02C 7/06 |
| | | | | 475/159 |
| 8,336,290 B2 * | 12/2012 | Glynn | .................... | B64C 11/38 |
| | | | | 60/268 |
| 9,708,053 B2 * | 7/2017 | Curlier | ................... | B64C 11/306 |
| 9,834,300 B2 * | 12/2017 | Fabre | ................... | B64C 11/385 |
| 10,024,241 B2 * | 7/2018 | Miller | ...................... | F02C 7/28 |
| 2010/0008779 A1 | 1/2010 | Carvalho et al. | | |
| 2012/0079808 A1 * | 4/2012 | Glynn | ....................... | F01D 7/00 |
| | | | | 60/268 |
| 2013/0052016 A1 * | 2/2013 | Szymandera | ......... | B64C 11/308 |
| | | | | 416/128 |
| 2014/0017086 A1 | 1/2014 | Charier et al. | | |
| 2015/0246725 A1 * | 9/2015 | Reilly | ................... | B64C 27/605 |
| | | | | 244/92 |
| 2015/0252690 A1 * | 9/2015 | Curlier | ................... | F01D 25/18 |
| | | | | 60/39.08 |
| 2016/0169046 A1 * | 6/2016 | Acius | ................... | F01D 25/243 |
| | | | | 415/200 |
| 2017/0102292 A1 * | 4/2017 | Mastro | .................. | F01D 21/003 |
| 2018/0043990 A1 * | 2/2018 | Tajan | ..................... | B64C 11/32 |

* cited by examiner

US 10,648,406 B2

MEANS FOR CONTROLLING A PITCH CHANGE SYSTEM COMPRISING AN ANTI-ROTATION DEVICE, A PITCH CHANGE SYSTEM EQUIPPED WITH SAID CONTROL MEANS, AND A CORRESPONDING TURBINE ENGINE

1. FIELD OF THE INVENTION

The present invention relates to the field of aeronautic propulsion. It relates to a means for controlling a system for changing the pitch of a blade of a propeller comprising an anti-rotation device, said device making it possible to prevent the rotation of a movable member relative to a fixed member of said control means. It also relates to a pitch change system equipped with a control means and to the corresponding turbine engine.

2. PRIOR ART

Changing the pitch or variable calibration of the blades of a turbine engine propeller is one of the ways to improve the performance and efficiency of turbine engines in different flight conditions.

Turbine engines such as turboprop engines having two propulsion propellers, for example contra-rotating propellers, which are also referred to as "open rotor" and "unducted fan", are known which are equipped with these pitch change systems. Turboprop engines can be distinguished from turbojet engines in that they use a propeller outside the (unducted) nacelle instead of a fan. The pitch change system can also be applied to a turboprop engine having one propulsion propeller or else can be adapted equally to one or each propeller.

In an open rotor type turboprop engine such as shown in FIG. 1, a gas generator part and a propulsion part are aligned and arranged in a fixed cylindrical nacelle 2 supported by the structure of the aircraft. The gas generator part is arranged in front of the propulsive part. Of course, the gas generator part can be arranged behind the propulsive part. The terms "upstream" and "downstream" are defined in relation to the circulation of the gases in the turbine engine. The gas generator part comprises, from upstream to downstream, an assembly of compressors 3, a combustion chamber 4, and an assembly of turbines 5. An exhaust nozzle 8 is arranged downstream of the gas generator. The assembly of compressors 3 can comprise one or two compressor(s) depending on whether the gas generator has a single-stage or two-stage architecture. The assembly of turbines 5 can comprise a high-pressure turbine and a low-pressure turbine, or two high-pressure and intermediate-pressure turbines and a low-pressure turbine. The gas generator drives the low-pressure turbine about a longitudinal axis X. The propulsive part comprises two coaxial contrarotating propellers 6, 7, which are upstream and downstream respectively, which are set into rotation inversely to one another by a turbine, in particular a low-pressure turbine, of the gas generator, by means of a mechanical transmission device 17 which is illustrated in a simple manner. The mechanical transmission device 17 comprises for example a reducer having epicycloidal gear trains. The propellers 6, 7 extend substantially radially with respect to the gear-shaft outside the nacelle 2. According to the configuration of this turbine engine, the air flow entering the turbine engine is compressed in the assembly of compressors 3, then mixed with fuel and burned in the combustion chamber 4. The combustion gases which are produced then pass into the turbines 5 in order to drive in inverse rotation, via the mechanical transmission device 17, the propellers 6, 7 which supply most of the thrust. It is of course possible to drive the upstream 6 and downstream 7 propellers directly by means of the low-pressure turbine. The combustion gases are expelled through the exhaust nozzle 8, thus contributing to the thrust of the turbine engine 1. The gases pass through a gas flow duct extending substantially axially in the turbine engine between the nacelle 2 and a central casing 38.

Generally, each propeller 6, 7 or propeller module comprises a substantially cylindrical rotary casing 9 supporting a hub having an outer polygonal ring 10 which is received so as to rotate about the longitudinal axis X in the fixed nacelle 2. The hub comprises radial cylindrical recesses 11 distributed over the periphery thereof about the longitudinal axis X. Shafts 12 having radial axes Y, in this case perpendicular to the longitudinal axis X, rigidly connected to the roots 13 of the blades 14, are received in the recesses 11 of the polygonal ring and also pass through radial passages in the cylindrical casing.

An example of pitch change system for changing the pitch of each propeller is known from the document WO2014/001723. In FIG. 2, this system 26 for changing the pitch of a downstream propeller is installed in the middle of the rotating parts of a turbine engine, such as that shown in FIG. 1, with a means for controlling 27 the rotation of the roots of the blades. Said control means comprises a fixed member 28 mounted on a fixed casing 15 of the turbine engine and a movable member 29 connected to a linking mechanism 31 which is connected to each shaft having a radial axis. The rotary casing 9 rotates about the fixed casing 15. For this purpose, at least one bearing is arranged between the fixed casing 15 and the rotary casing 9. The system 26 also comprises a load-transfer bearing 19, the inner ring of which is rigidly connected to the movable member 29, and the outer ring of which is connected to the linking mechanism 31, and means 23 for lubricating said bearing 19. The movement of the movable member 29 following the fluidic control of the actuator provides the required angular pivoting of the blades by the linking mechanism 31 by pivoting the radial shafts connected to the blades. The control means 27 comprises an anti-rotation bar 22 preventing the rotation of the movable member relative to the fixed member. Through said anti-rotation bar 22 extends a line 23a of the lubricating means 23 which is firstly connected to a source 24 for supplying lubricating fluid and secondly in communication with the bearing 19 to supply said bearing with lubricating fluid. The movable member 29 comprises a radial opening 25 which opens into a chamber 34 which is formed by an annular support of the internal ring of the bearing.

However, an anti-rotation bar 22 of this type is installed between the movable member 29 and the fixed member 28 of the control means 27, and passes through chambers of the movable member 29, which complicates the assembly of the pitch change system. As the control means 27 is subjected to significant radial forces from the rotating part, said means deforms and can involve sealing problems which inevitably affect the line 23a and means for lubricating the members to be supplied/lubricated. These forces are multiplied when the actuator is such that it plays a structural role. The arrangement of the anti-rotation bar 22 between the movable member 29 and the fixed member 28 also leads to an increase in the size of the system. More specifically, the usable cross section of the actuator is affected, which entails an actuator of a greater size. Secondly, this configuration does not allow a homogeneous supply of the load-transfer bearing 19 which is located radially above the movable member 29. A single supply point is provided for this bearing 19. This results in a problem in terms of the homogeneity of the lubrication of the load-transfer bearing 19. The pitch change system also requires the integration of other lubricating means for members which are necessary for the operation of the control means or of the pitch change system, which are subjected to significant thermal and mechanical stresses. Such members are for example the bearing for guiding the fixed member in rotation relative to the rotary casing which, in the case of the upstream propeller, is arranged downstream of the control means. The sizing and the integration of said anti-rotation bar and the multitude of lubricating means in the restricted environment of this rotating part affect the mass of the turbine engine.

3. AIM OF THE INVENTION

The aim of the present invention is in particular that of proposing a control means which makes it possible to simplify the integration of various ancillaries between the rotating parts and the fixed parts of the turbine engine whilst taking into account the problems relating to integration in a congested environment and the movements of the control means.

4. SUMMARY OF THE INVENTION

This aim is achieved, in accordance with the invention, by a control means of pitch change system for changing the pitch of blades of at least one turbine engine propeller. The control means comprises a fixed member and a member which is movable in translation along a longitudinal axis relative to said fixed member and an anti-rotation device which is configured so as to prevent the rotation of the movable member relative to the fixed member about the longitudinal axis. The anti-rotation device comprises a longitudinal structural crossmember which is mounted by means of a first and second end on the fixed member and support and guide means integrally in translation with the movable member along the longitudinal axis. The crossmember extends radially outside the movable member and the fixed member relative to a radial axis which is perpendicular to the longitudinal axis and being guided through the support and guide means.

Thus, this solution makes it possible to achieve the above-mentioned aim. In particular, arranging the crossmember radially outside the movable member and the fixed member of the control means makes it possible, firstly, to prevent the rotation of the movable member relative to the fixed member, and secondly to install ancillaries for the operation of the control means, of the pitch change system, or also of the turbine engine, without affecting the restricted environment and the mass of the turbine engine. Since the ancillaries and other equipment do not pass through the chambers of the control means, as is the case in the prior art, there is no risk of leaks, and it is easy to arrange other ancillaries and other functionalities there. The passage of ancillaries between the fixed and rotating parts is carried out without obstacles.

According to one feature of the invention, the crossmember is passed through, along an axis which is substantially in parallel with the longitudinal axis, by a line for supplying lubricant which is connected to a supplying source for supplying lubricant and supplying a component of the turbine engine. In this way, the line is not subjected to significant thermal and mechanical stresses, as was the case in the prior art, and makes it possible to route lubricant from the fixed part towards the component of the pitch change system in the rotating part which needs to be supplied without congesting the environment thereof. In particular, the line passes through the crossmember on both sides along the axis which is in parallel with the longitudinal axis.

In an advantageous, but non-limiting, manner, the crossmember is hollow so as to allow the passage of the line for supplying lubricant.

According to one feature of the invention, the crossmember is structural by means of the anti-rotation function thereof.

According to another feature of the invention, the supply line is mounted in an axially sliding manner in the crossmember. This mounting makes it possible to not over-strain the hydraulic system, and the supply line can adapt to the movements of adjacent lines.

According to yet another feature of the invention, the crossmember comprises damping means between an internal wall of the crossmember and an external wall of the supply line. This configuration makes it possible to prevent vibrations and impacts between the supply line and the crossmember. The damping means also make it possible to support the supply line in order to observe the length rules not supported by other types of line. Furthermore, the damping means facilitate the axial sliding of the supply line in the crossmember.

In an advantageous, but non-limiting, manner, the damping means comprise O rings.

In an advantageous, but non-limiting, manner, the support and guide means of the movable member comprise bearings allowing the movement thereof relative to the crossmember along the longitudinal axis.

According to yet another feature of the invention, the crossmember comprises a lateral stop against which one of the rolling bearings bears. Said lateral stop prevents the placement of a contact on the lower side of the crossmember opposite the movable member. Secondly, the lateral stop makes it possible to absorb the torque of the rolling bearings.

According to yet another feature of the invention, the crossmember has a U-shaped cross section having first and second flanks which are connected to a transverse base and an opening, the device comprising a lid which is capable of closing said opening in the crossmember. This opening makes it possible to install the line, and the added lid makes it possible to maintain the structural integrity of the crossmember.

According to yet another feature of the invention, the crossmember is configured so as to receive instrumentation means which are arranged opposite the control means. Such a configuration makes it possible to not hinder the anti-rotation function of the anti-rotation device. Secondly, the installation of the instrumentation means on the crossmember makes it possible to not congest the environment of the pitch change system. The use of bridging, electric welding, clamps, cable assemblies, etc. is avoided, and this also makes it possible to save time.

The invention also relates to a system for changing the pitch of blades of at least one turbine engine propeller equipped with a plurality of blades, the system comprising at least one control means having any of the above-mentioned features.

According to this system, the control means acts on a linking mechanism connected to the blades of the propeller and comprises a load-transfer module arranged between the linking mechanism and the control means, the load-transfer module comprising at least one load-transfer bearing mounted on the movable member and cooperating with the linking mechanism.

The invention also relates to a turbine engine comprising at least one pitch change system having the above-mentioned features.

5. BRIEF DESCRIPTION OF THE DRAWINGS

The invention will be better understood, and other aims, details, features and advantages thereof will become more clearly apparent upon reading the detailed explanatory description that follows, of embodiments of the invention given as purely illustrative and non-limiting examples, with reference to the accompanying schematic drawings, in which.

6. DESCRIPTION OF EMBODIMENTS OF THE INVENTION

Figure 1:
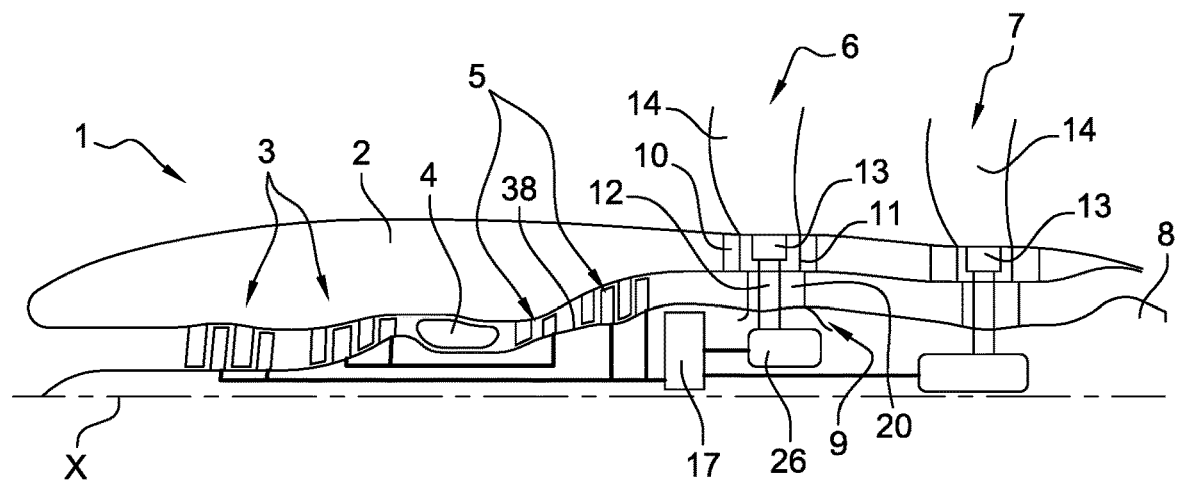
FIG. 1 is a schematic, axial section of an example of a turbine engine according to the invention.
Figure 2:
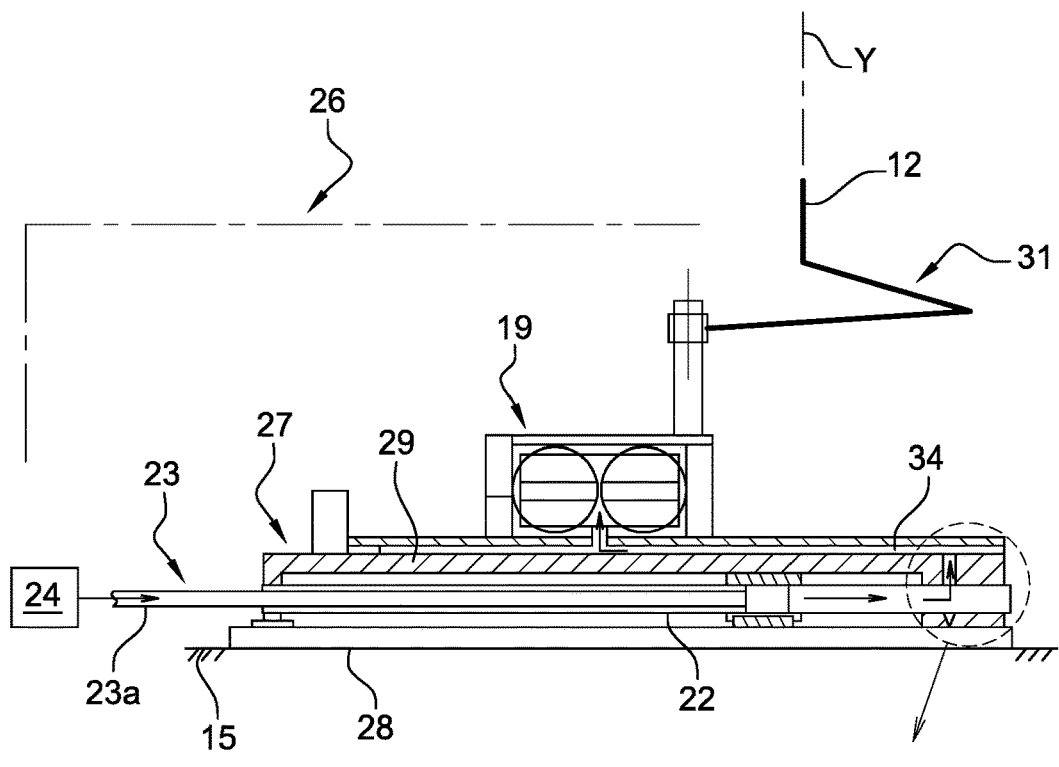
FIG. 2 shows an example of a system for changing the pitch of blades of a propeller according to one example from the prior art.

FIG. 1 and the rest of the description show and describe a turboprop engine having a longitudinal axis X and an unducted fan, which engine is intended to be mounted on an aircraft. However, the invention can be applied to other types of turbine engine. The corresponding reference numerals of the elements of the turboprop engine described previously will be used throughout the rest of the description.

Figure 3:
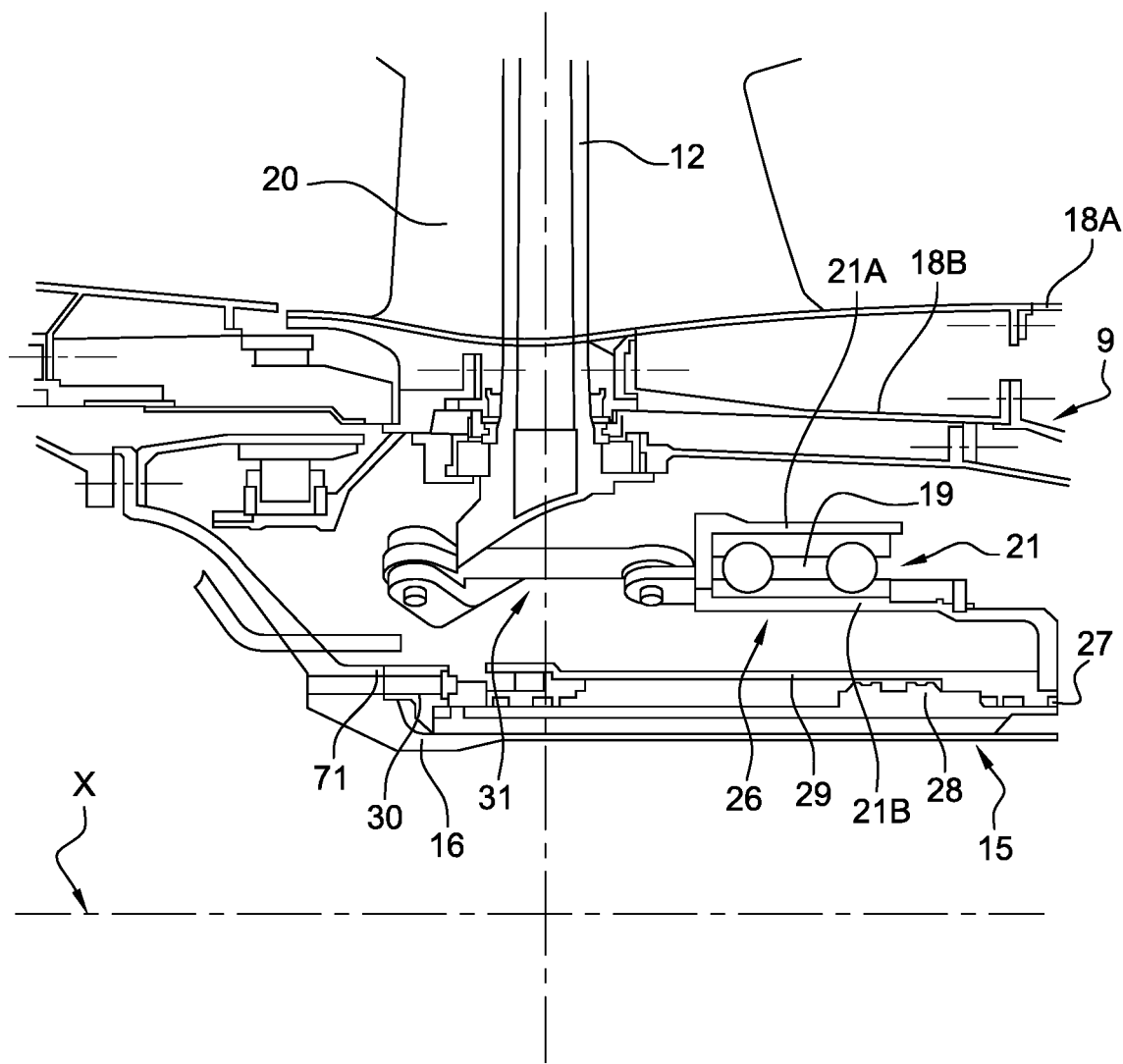
FIG. 3 is an axial sectional view showing in greater detail, and in a schematic manner, elements of a pitch change system which are connected to a blade of a propeller according to the invention.

According to FIG. 3, the turbine engine comprises a pitch change system 26 for changing the pitch of the blades 14 of the propeller 6, making it possible to vary the calibration or the pitch of the blades 14 around the radial axes Y thereof in such a way that said blades occupy angular positions according to the operating conditions of the turbine engine and the flight phases in question. The radial axis Y in this case is perpendicular to the longitudinal axis X. The system 26 comprises a control means 27 controlling the pitch change of each of the blades 14 and a linking mechanism 31 connecting the control means 27 to the roots 13 of the blades 14. The control means 27 is received between a rotary casing 9 or rotor casing and a fixed casing 15 or stator casing of the turbine engine. The substantially cylindrical casing 9 is mounted, in the nacelle 2 of the turbine engine, so as to rotate relative to the fixed casing 15 about the longitudinal axis X. The rotary casing 9 is supported directly by rolling bearings on the fixed casing 15 to ensure the rotation thereof relative to the axis X. The fixed casing 15 and the rotary casing 9 are coaxial. Each blade 14 extends outside the nacelle 2. The roots 13 of the blades 14 are received in the polygonal ring 10 and are each connected to a radial shaft 12. The shafts 12 extend radially through a structural arm 20 connecting the polygonal ring 10 and a first external wall 18A of the casing 9. Said first external wall 18A is downstream of the central casing 38. Said wall forms part of the radially internal wall of the gas flow duct. The linking mechanism 31 is connected to the radial shafts 12. The control means 27 is arranged so as to move the linking mechanism 31 in a substantially axial manner along the axis X in such a way that the axial movement of the linking mechanism 31 leads to the pivoting of the radial shafts 12. A load-transfer module 21 with a load-transfer bearing 19 is arranged between the movable member 29 and the linking mechanism 31 so as to ensure the transmission of the axial forces exerted by the movable member 29. The load-transfer module 21 comprises an annular external collar 21A connected to the linking mechanism 31 and an internal collar 21B connected to the movable member 29. Said bearing 19 comprises an external ring rigidly connected to the collar 21A and an internal ring rigidly connected to the collar 21B. In this case, the bearing 19 is formed by a rolling bearing having two rows of ball bearings which can be of the angular contact type oriented in opposite directions so as to optimise the transmission of the axial forces.

Figure 4:
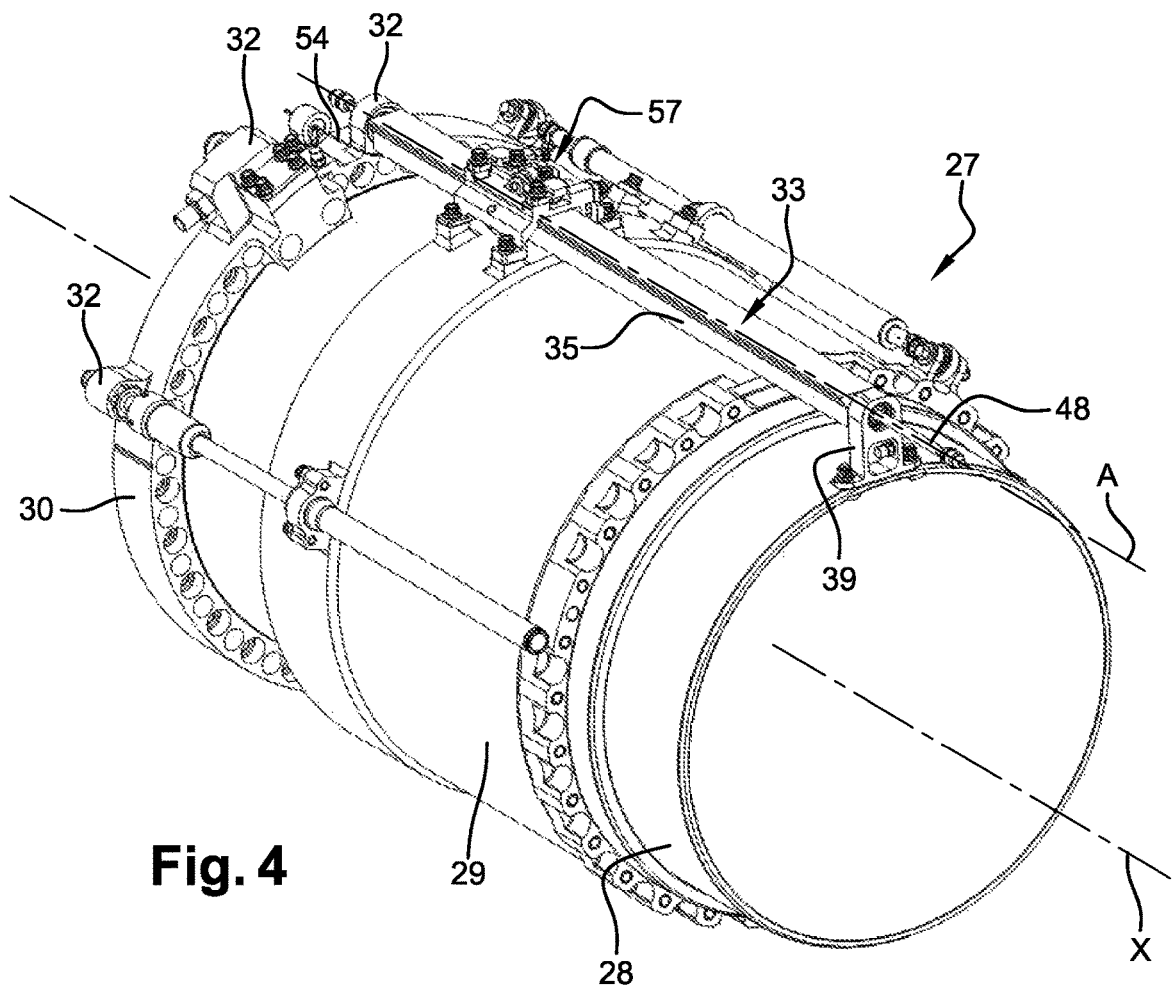
FIG. 4 is a perspective view of an example of a control means according to the invention.

With reference to FIGS. 3 and 4, the control means 27 comprises a fixed member 28 and a member 29 which is movable in translation relative to the fixed member 28 along the axis X. The fixed member 28 is cylindrical and has a circular cross section. The fixed member 28 surrounds a cylindrical wall 16 (cf. FIG. 3) of the fixed casing 15 and is mounted rigidly connected thereto so as to be secured against rotation and translation relative to the fixed casing 15. For this purpose, the fixed member 28 comprises a connecting ring 30 provided at an upstream end of the fixed member 28 and in abutment against a shoulder 71 of the fixed casing 15. The connecting ring 30 is mounted on the fixed casing 15. Such a mounting makes it possible for the control means to not constitute a structural element which is part of the fixed casing 15. The connecting ring 30 is provided with connecting interfaces 32 allowing the connection of various equipment necessary for the supply and the operation of the control means 27. The cylindrical wall 16 of the fixed casing 15 extends axially between an internal wall and a second, external wall 18B of the rotary casing 9. The movable member 29 is arranged around the fixed member 28 and is coaxial with the axis X. In this way, the movable member 29 moves axially as a result of a command from the control means 27. The movable member 29 moves solely in translation and is secured against rotation relative to the fixed member by means of an anti-rotation device 33. Said anti-rotation device 33 makes it possible in particular to prevent the rotation of the control means 27 about the axis X during the operation of the turbine engine. In the present invention, the control means 27 comprises an actuator which advantageously has an annular control actuator consisting of the rod thereof which is movable relative to a fixed cylinder which is rigidly connected to the fixed casing 15. The movable rod is formed by the movable member 29, whereas the fixed cylinder is formed by the fixed member 28.

Figure 5:
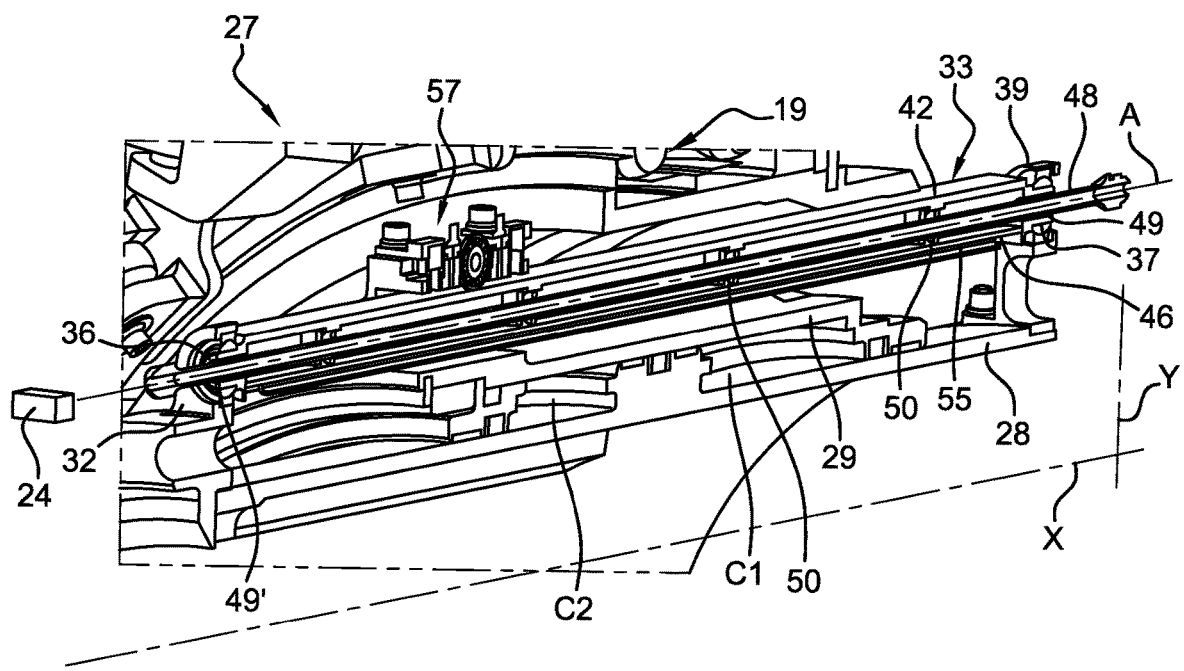
FIG. 5 is an axial sectional view in perspective of an anti-rotation device mounted on a control means according to the invention.
Figure 6:
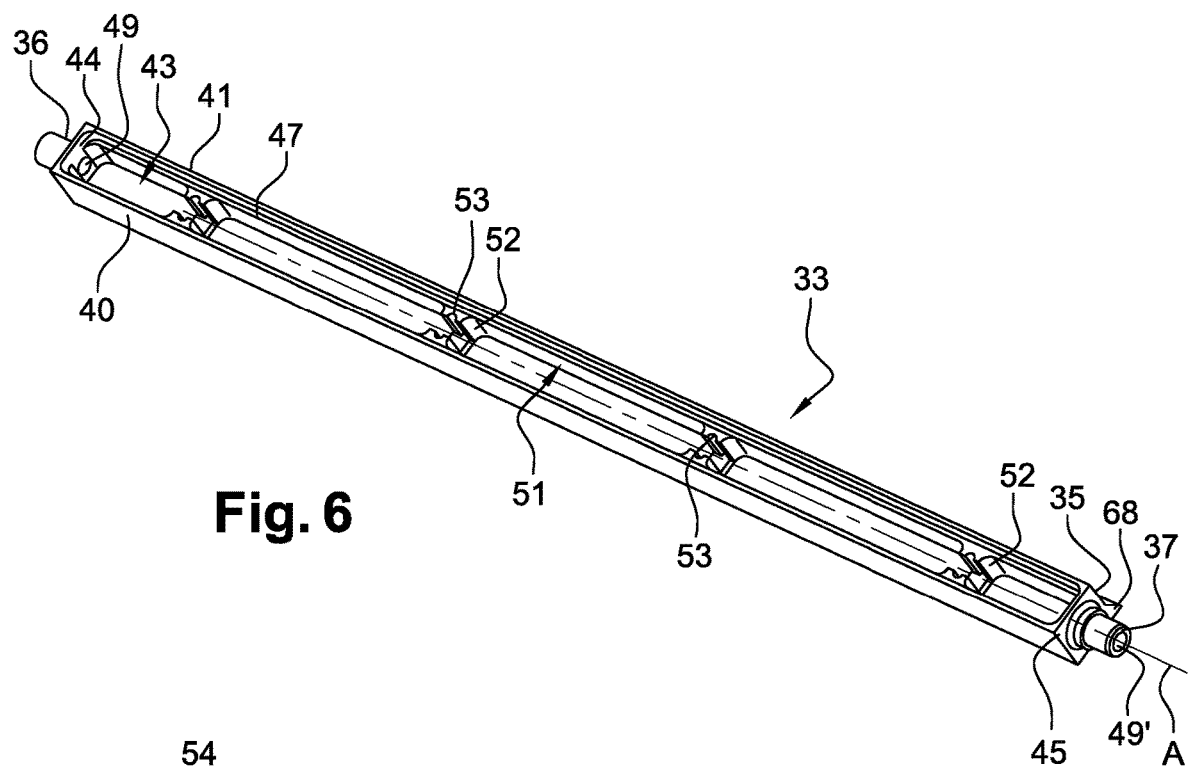
FIG. 6 is a perspective view from below of an example of an anti-rotation device according to the invention.
Figure 7:
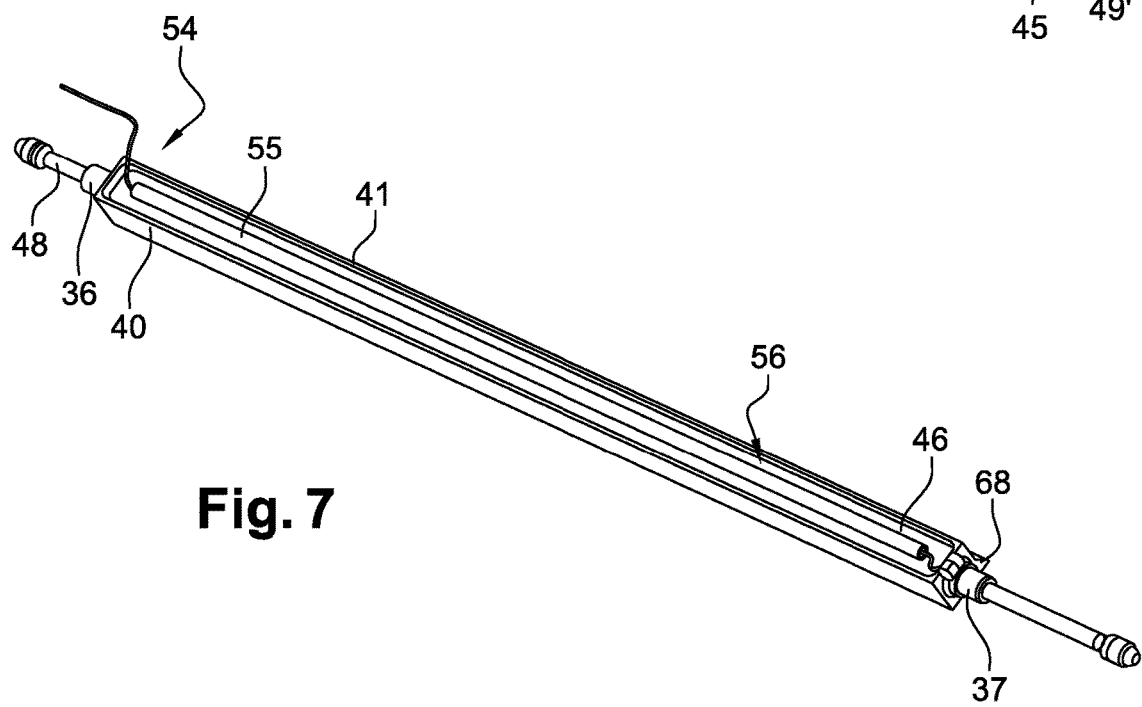
FIG. 7 shows said anti-rotation device with a lid and instrumentation means according to the invention.

With reference to FIGS. 5, 6 and 7, the anti-rotation device 33 comprises a structural crossmember 35 extending along an axis A in parallel with the longitudinal axis X radially outside the movable member 29 and the fixed member 28. In the rest of the description, the terms "high", "low", "upper", "lower", "above", and "below" are defined in relation to the radial axis Y. In other words, the crossmember 35 is arranged above the fixed member 28 and the movable member 29. Thus, the chambers C1, C2 of the control means 27 are not congested. The device 33 is arranged radially between the control means 27 and the load-transfer module 21 which is moved offset from control means 27. The crossmember 35 comprises a first end 36 and a second end 37 which are axially opposite one another. The first end 36 is connected to an interface 32 which is provided on the connecting ring 30. Said interface 32 is rigidly connected to the ring 30. In particular, the first end 36 is received in a first cavity of the interface 32. The second end 37 is connected to a clevis 39 which is fixed to the downstream edge of the fixed member 28. The second end 37 is also received in a second cavity of the clevis 39. In the present example, the first and second ends 36, 37 have a circular cross section. Of course, the first and second ends 36, 37 can have another cross section which is adapted to the first and second cavities in which said ends are received.

According to one feature of the invention, the crossmember 35 is hollow. In particular, said crossmember has a substantially U-shaped cross section, with first and second lateral flanks 40, 41 which extend along the axis A. Said first and second flanks are each defined in a plane which is substantially in parallel with the axis Y. The first and second lateral flanks 40, 41 are each connected to a transverse base 42. The first and second flanks 40, 41 form a longitudinal opening 43 at the free end thereof. The crossmember also comprises first and second portions 44, 45 connecting the base 42 and the first and second flanks 40, 41. Said first and second portions 44, 45 are each defined in a plane perpendicular to the planes of the base 42 and of the first and second flanks. The opening 43 makes it possible to access the interior of the crossmember 35. Advantageously, the crossmember 35 is produced by machining. The opening 43 is closed by a lid 46 (cf. FIG. 7) extending along the axis A so as to maintain the structural integrity of the crossmember 35. In particular, each first and second flank 40, 41 comprises, in the vicinity of the free end thereof, a longitudinal shoulder 47 on which the lid 46 rests and bears. Said lid 46 is arranged opposite the external walls of the fixed and movable members 28, 29.

Inside the crossmember 35 extends, along the axis A, a line 48 for supplying lubricant to a component of the turbine engine. The line 48 is connected firstly to a supply source 24 for the supply thereof, and secondly to the component of the turbine engine. The supply source 24 is installed on the fixed parts of the turbine engine. In particular, the line 48 extends along the crossmember along the axis A and passes through the crossmember 35 on both sides along the axis A. The line 48 passes through the interface 32 to which is connected the source 24 for supplying lubricant and the clevis 39. For this purpose, each first portion 44 and second portion 45 comprises an opening 49, 49' passing through axially on both sides of said portions 44, 45. Said openings 49, 49' open out respectively, firstly, inside the first and second ends 36, 37 and, secondly, inside the crossmember 35. Each first and second end 36, 37 is rigidly connected to a first and second portion 44, 45 respectively. The line 48 opens out through the openings 49, 49' in the crossmember 35.

In an advantageous, but non-limiting, manner, the line 48 is mounted in a sliding manner in the crossmember 35 so as not to over-strain the hydraulic system. The line 48 has a substantially circular cross section. The device 33 also comprises damping means 50 installed inside the crossmember 35. Said damping means 50 make it possible to absorb shocks and vibrations between the line 48 and the crossmember 35 during the operation of the pitch change system. The crossmember 35 comprises an internal wall 51 on which bosses 52 are formed. The bosses 52 are regularly distributed along the axis A. Each boss 52 has a U-shaped cross section (transverse to the axis A). Alternatively, the bosses can be formed solely on the internal wall of the first and second flanks 40, 41. In each boss 52, a groove 53 is produced, in which the damping means 50 which can be seen in FIG. 5 are received. Said damping means 50 comprise damping seals. Preferably, but in a non-limiting manner, said seals are O rings. The seals are produced from a polymer material. The polymer material is for example an elastomer.

The anti-rotation device 33 is configured so as to receive instrumentation means 54 which are arranged opposite the control means 27. In the embodiment as shown in FIGS. 5 and 7, the lid 46 comprises an annular portion 55 arranged on an external face 56 of the lid 46. Of course, the portion 55 could have another shape, for example rectangular. The portion 55 extends along an axis in parallel with the longitudinal axis X. Said portion is arranged opposite the movable member 29 of the control means 27. The instrumentation means are received in said portion, which allows said means to be protected. The instrumentation means 54 comprise for example electrical cables which make it possible to power equipment of the pitch change system and the turbine engine.

The component to be lubricated, in the present invention, is the load-transfer bearing 19 of the load-transfer module. The crossmember 35 makes it possible to route the lubricant from the supply source 24 located in the region of the fixed parts to the middle of the rotating parts in a simple manner and without obstacles. The lubricant is advantageously an oil.

The structural crossmember 35 is guided through support and guide means 57 fixed to the movable member 29. Said support and guide means 57 act as a radial stop and also allow the movable member 29 to be guided during the axial movement thereof along the axis X. In other words, the support and guide means 57 slide about the crossmember 35. The means 57 are fixed by means of fixing components 58 such as screws or other similar components.

Figure 8:
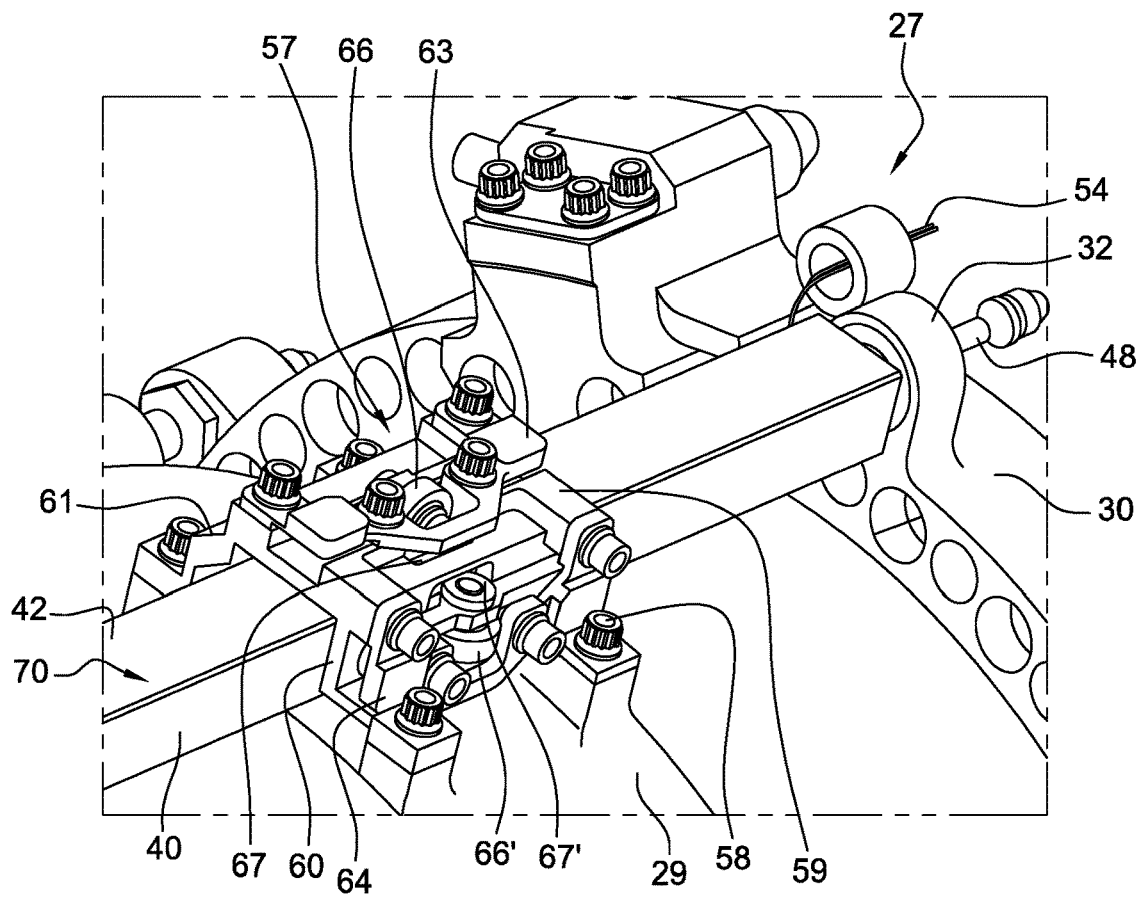
FIG. 8 is a partial, perspective view of an example of support and guide means cooperating with a crossmember of the anti-rotation device according to the invention.
Figure 9:
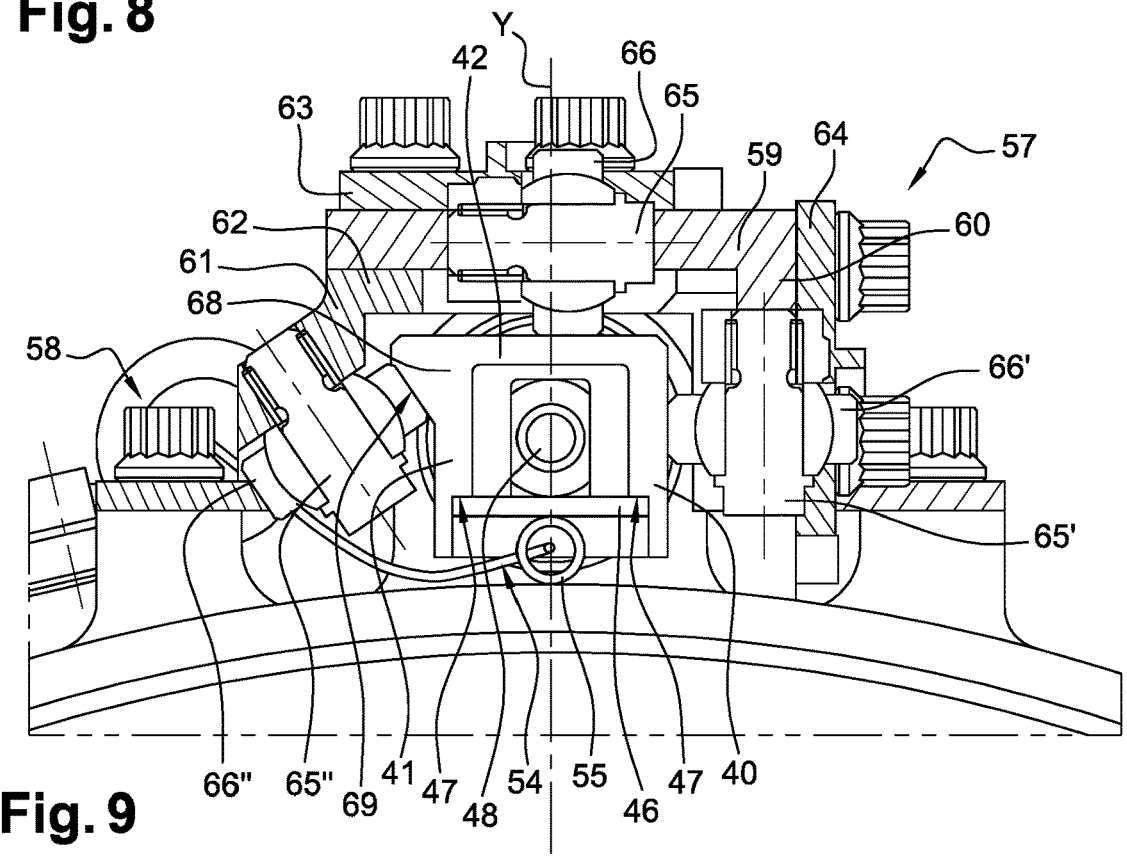
FIG. 9 is a cross section of the support and guide means as shown in FIG. 8.

With reference to FIGS. 8 and 9, the support and guide means 57 comprise rolling bearings allowing the movement thereof along the crossmember 35. The means 57 comprise a member having a U-shaped cross section overall. In particular, the means comprise a first, a second and a third wall 59, 60, 61 forming a substantially U-shaped cross section and cooperating with the base 42 and the first and second flanks 40, 41 of the crossmember 35. In particular, the first wall 59 is defined in a plane perpendicular to the radial axis Y. The first wall 59 is arranged opposite the base 42 of the crossmember 35. From said first wall 59 extends a second, lateral wall 60 defined in a plane in parallel with the radial axis Y. The second wall 60 is arranged opposite the first flank 40 of the crossmember 35. In this case, the second wall 60 is formed integrally with the first wall 59 of the support and guide means 57. Alternatively, the second wall 60 is fixed to the first wall 59. A third wall 61 extends transversely to the radial axis Y and is rigidly connected to the first wall 59. The third wall 61 is rigidly connected to the first wall 59 by means of a lug 62 extending in a plane in parallel with that of the first wall 59. Alternatively, the third wall 61 is formed in one-piece with the first wall 59. On the first and second walls 59, 60 are mounted a first and second plate 63, 64 respectively. Each first plate 63 and second plate 64 supports an articulation shaft 65, 65'. The articulation shaft 65 of the first plate 63 is perpendicular to the radial axis Y and supports a rolling bearing 66. For this purpose, the first wall 59 of the support and guide means 57 comprises an opening 67 allowing the passage of a portion of the rolling bearing 66 which is in contact with the base 42. Likewise, the articulation shaft 65' of the second plate 64 is in parallel with the radial axis Y and supports a rolling bearing 66'. The second plate 64 also comprises an opening 67' for the passage of a portion of the rolling bearing 66' which is in contact with the first flank 40 of the crossmember 35. As for the third wall 61, said wall supports an articulation shaft 65" which is transverse to the radial axis Y and the axis X. Said articulation shaft 65" also supports a rolling bearing 66" which is in contact with a lateral stop 68 formed on the second flank 41 of the crossmember 35. Said lateral stop 68 is formed by a projection extending from the second flank 41 and the base 42 of the crossmember. In particular, the lateral stop 68 comprises a surface 69 defined in a plane which is transverse to the radial axis Y and an upper face 70 defined in a plane perpendicular to the radial axis Y. The upper face 70 of the stop is an extension of the face of the base 42 of the crossmember 35. Alternatively, the articulation shafts of the rolling bearings 66, 66' are supported by the walls 59, 60. The rolling bearing 66" of the third wall 61 is arranged between the third wall 61 and the second flank 41 of the crossmember 35. Advantageously, the orientation of the surface 69 makes it possible to optimise the absorption of the torque induced on the movable member 29 by rotating the rotary casing 9 driving the linking mechanism and the load-transfer bearing 19.

Thus, during the movement of the movable member 29 along the longitudinal axis X, the support and guide means 57 also move relative to the crossmember 35 inside which the line 48 extends. The lubricant thus circulates from the supply source, inside the crossmember 35, towards the component to be supplied. The instrumentation means 54 installed on the crossmember 35 do not hinder the movement of the movable member 29 and do not congest the environment of the pitch change system.

The invention claimed is:

1. Control means of a pitch change system for changing the pitch of blades of at least one turbine engine propeller, the control means comprising a fixed member and a member which is movable in translation along a longitudinal axis relative to said fixed member and an anti-rotation device which is configured so as to prevent the rotation of the movable member relative to the fixed member about the longitudinal axis, wherein the anti-rotation device comprises a longitudinal structural crossmember which is mounted by means of a first and a second end on the fixed member and support and guide means movable in translation with the movable member along the longitudinal axis, the crossmember extending radially outside the movable member and the fixed member relative to a radial axis which is perpendicular to the longitudinal axis and being guided through the support and guide means.

2. Control means according to claim 1, wherein the crossmember is passed through, along an axis which is substantially parallel with the longitudinal axis, by a line for supplying lubricant which is connected to a lubricant source for supplying lubricant to a component of the turbine engine.

3. Control means according to claim 2, wherein the line is mounted in a sliding manner in the crossmember.

4. Control means according to claim 2, wherein the crossmember comprises damping means between an internal wall of the crossmember and an external wall of the line.

5. Control means according to claim 1, wherein the support and guide means comprise rolling bearings which allow the movement thereof relative to the crossmember along the longitudinal axis.

6. Control means according to claim 5, wherein the crossmember comprises a lateral stop against which one of the rolling bearings bears.

7. Control means according to claim 1, wherein the crossmember has a U-shaped cross section having first and second flanks which are connected to a transverse base and an opening, the anti-rotation device comprising a lid which is capable of closing said opening in the crossmember.

8. Control means according to claim 7, wherein the crossmember is configured so as to receive instrumentation arranged opposite the control means.

9. A pitch change system for changing the pitch of blades of at least one turbine engine propeller equipped with a plurality of blades, the system comprising at least one control means according to claim 1.

10. A turbine engine comprising at least one pitch change system according to claim 9.

* * * * *